United States Patent
Nash et al.

(10) Patent No.: US 10,579,720 B2
(45) Date of Patent: *Mar. 3, 2020

(54) USER INFORMATION POPULATION

(71) Applicant: PAYPAL, INC., San Jose, CA (US)

(72) Inventors: Andrew Keith Nash, Foster City, CA (US); Michael Barrett, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 359 days.

This patent is subject to a terminal disclaimer.

(21) Appl. No.: 15/043,461

(22) Filed: Feb. 12, 2016

(65) Prior Publication Data

US 2016/0162460 A1    Jun. 9, 2016

Related U.S. Application Data

(63) Continuation of application No. 12/569,556, filed on Sep. 29, 2009, now Pat. No. 9,262,392.

(51) Int. Cl.
  *G06F 17/24* (2006.01)
  *G06Q 10/10* (2012.01)
  *G06Q 30/02* (2012.01)
  *G06Q 30/06* (2012.01)

(52) U.S. Cl.
  CPC .......... *G06F 17/243* (2013.01); *G06Q 10/10* (2013.01); *G06Q 30/02* (2013.01); *G06Q 30/0601* (2013.01); *G06Q 30/0609* (2013.01)

(58) Field of Classification Search
  CPC ......... H04L 63/08; G06F 21/31; G06F 17/243
  See application file for complete search history.

(56) References Cited

U.S. PATENT DOCUMENTS

| | | |
|---|---|---|
| 7,257,581 B1 | 8/2007 | Steele et al. |
| 8,180,654 B2 | 5/2012 | Berkman et al. |
| 2002/0007351 A1 | 1/2002 | Hillegass et al. |
| 2003/0204439 A1 | 10/2003 | Cullen, III |
| 2004/0059952 A1* | 3/2004 | Newport ............ G06Q 20/02 726/3 |
| 2004/0068693 A1* | 4/2004 | Rawat ............... G06F 17/243 715/226 |
| 2006/0015716 A1 | 1/2006 | Thornton et al. |
| 2006/0294025 A1 | 12/2006 | Mengerink |
| 2007/0060354 A1 | 3/2007 | Theimer et al. |
| 2007/0150419 A1 | 6/2007 | Kozlay |
| 2008/0052245 A1 | 2/2008 | Love |

(Continued)

*Primary Examiner* — Maung T Lwin
*Assistant Examiner* — Suman Debnath
(74) *Attorney, Agent, or Firm* — Haynes and Boone LLP

(57) ABSTRACT

Methods and systems are provided for populating user related information, such as in forms at web sites. For example, a method can include providing a web site with information about a user during the front end of accessing the web site by the user. The information can be used to facilitate use of the web site by the user. A system for facilitating access of a web site by a user can comprise an ID provider that is configured to receive a request from a web site for information regarding a user, request information regarding the user from an information provider, and forward the information to the web site. By providing such information to the web site, log on, sign in, and/or registration with a web site can be done quickly, conveniently, and in a manner that is substantially less prone to errors.

20 Claims, 2 Drawing Sheets

(56) References Cited

U.S. PATENT DOCUMENTS

2009/0300097 A1\* 12/2009 Meyer .................. G06F 17/243
709/203
2010/0082792 A1 4/2010 Johnson \* cited by examiner Registration Form First Name: ☐

Last Name: ☐

Email Address: ☐

Home Address:

Street Name: ☐

City: ☐

State: ☐ Zip: ☐

Ship to Address:

Street Name: ☐

City: ☐

State: ☐ Zip: ☐

Billing Address:

Street Name: ☐

City: ☐

State: ☐ Zip: ☐

Home Phone: ☐ - ☐ - ☐

Work Phone: ☐ - ☐ - ☐

User Name: ☐

Password: ☐

Confirm Password: ☐

Fig. 3

USER INFORMATION POPULATION

CROSS REFERENCE TO RELATED APPLICATION

This application is a continuation of U.S. application Ser. No. 12/569,556, filed Sep. 29, 2009, the entirety of which is incorporated herein by reference.

TECHNICAL FIELD

The present invention relates generally to networking. The present invention relates more particularly, for example, to methods and systems for registering a user with a web site.

BACKGROUND

Web sites, such as those accessed via the Internet, are well known. Web sites are commonly used to provide information and to sell merchandise. Merchant web sites are examples of web sites. Merchant web sites are commonly used to sell merchandise on the Internet.

Merchant web sites, as well as other web sites, can require that a consumer or user register, log on, and/or sign in prior to gaining further access to the web site. Such logging on, signing in, and/or registering is generally intended, at least in part, to identify the consumer. Registering and ordering merchandise from a merchant web site often requires that a form be filled out so as to provide information needed by the merchant regarding billing and shipping.

It is often required, such as during registration or merchandise ordering, for the consumer to provide information such as the user's email address, mailing address, shipping address, name, and user name to the web site. This information is entering by typing it into a form on the web site. As anyone who has performed this process will appreciate, such typing is typically time consuming and annoying. The typing process is prone to errors which can further consume time, annoy the consumer, and cause problems in filling an order.

Thus, although this contemporary method, i.e., manually typing, for providing information to web sites has proven generally suitable for its intended purpose, this method possesses inherent deficiencies which detract from its overall effectiveness and desirability. Therefore, it is desirable to provide a way to log on, sign in, register, and/or order merchandise at a web site that is quick, convenient, and less prone to errors.

BRIEF SUMMARY

In accordance with embodiments further described herein, methods and systems for populating user related information in forms at web sites are provided. For example, in one embodiment, a method comprises providing a web site with information about a user. The information can be provided from a computer of an ID provider at a front end of accessing the web site by a user. The information can be suitable for facilitating use of the web site by the user. For example, the information can be used to populate a form of the web site in order to log on, sign in, register, and/or purchase merchandise at a web site.

In another embodiment, a system for facilitating access to a web site by a user can comprise an ID provider that is configured to receive a request from a web site for information regarding a user, request information regarding the user from an information provider, and forward the information to the web site.

These and other features and advantages of the present invention will be more readily apparent from the detailed description of the embodiments set forth below taken in conjunction with the accompanying drawings.

BRIEF DESCRIPTION OF THE DRAWINGS

FIG. 3 is an example of a form, such as a form used to log on, sign in, and/or register a user with a web site, according to an example of an embodiment.

Embodiments of the present invention and their advantages are best understood by referring to the detailed description that follows. It should be appreciated that like reference numerals are used to identify like elements illustrated in one or more of the figures.

EXAMPLES OF EMBODIMENTS

Figure 1:
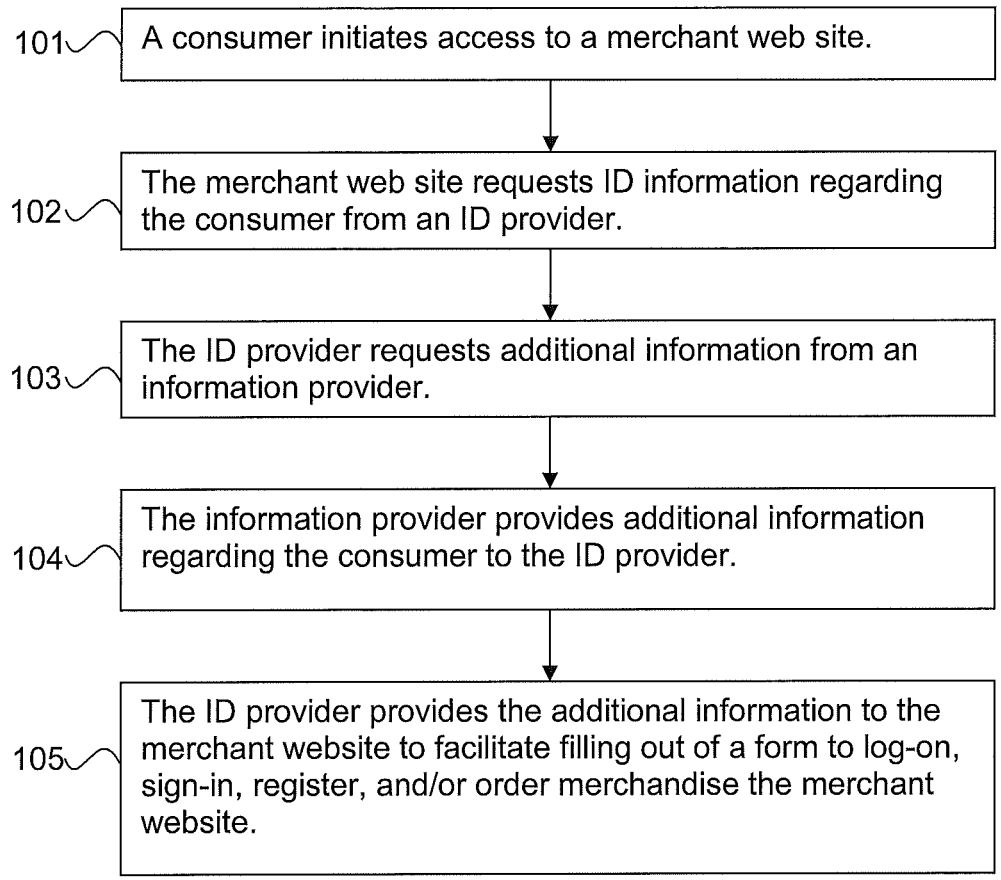
FIG. 1 is a flow chart showing a method for populating user information at a web site, according to an example of an embodiment.

As examples, methods and systems for populating user information at web sites are disclosed. The web sites can be merchant web sites, for example. Thus, the methods and systems can facilitate log on, sign in, registration and/or ordering for a user of a web site so as to facilitate purchasing of merchandise by the user at the web site. The methods and system can similarly be used to provide information to any kind of web site for any purpose.

According to an example of an embodiment, a method can comprise providing a web site with information about a user. The information can be provided from a computer of an ID provider at a front end of accessing the web site by a user. For example, the information can be provided so as to facilitate log on, sign in, and/or registration of a user with a web site. The information can similarly be used to at least partially fill out a form during a merchandise ordering process. Thus, the information can be suitable for facilitating use of the web site by the user.

For example, the information can be used to facilitate filling out of a form on the web site, wherein filing out the form can be part of the log on, sign in, registration, ordering, or any other process. That is, the information can be used to facilitate log on, sign in, and/or registration of the user onto the web site and can also be used to purchase merchandise from the web site. In this manner, the user can be spared the inconvenience of having to manually type this information into one or more forms of the web site.

The information can be provided from an information provider to the ID provider prior providing the information to the web site. For example, the information can be provided from a computer of the information provider to a computer of the ID provider via a network. Similarly, the information can be provided from the ID provider to the web site via a network. In either instance, the network can be a local area network (LAN), a wide area network (WAN) such as the Internet, or any combination thereof.

The information can comprise one or more items such as email addresses, mailing addresses, shipping addresses, names, and user names. Any other desired information can likewise be provided.

The information can be provided to the ID provider by a single information provider or a plurality of information providers. The information can be provided to the ID provider by any desired number of information providers.

Information regarding the user can be stored for use at a later time, such as when a user subsequently accesses a different web site. The information can be stored in a computer of the ID provider, such as at a site of the ID provider. The information can be stored in a computer of the user, such as at a location of the user. The information can be stored in any desired computer at any desired location.

The information can be provided to the web site in response to a request from the web site or the user. Thus, the information can be pulled to the web site by a computer of the web site.

The information can be provided to the web site in response to a command from the ID provider or the user. Thus, the information can be pushed to the web site by a computer of the ID provider or the user. Indeed, any desired combination of pulling and pushing of the information can be used.

Permission from the user can be requested for the ID provider to provide information about the user to the web site. Optionally, the information about the user can be provided to the web site only if permission is granted.

The web site can comprise a merchant web site. Alternatively, the web site can comprise any other desired type of web site.

According to an example of an embodiment, a system can facilitate access of a web site by a user. The system can comprise an ID provider that is configured to receive a request from a web site for information regarding a user, request information regarding the user from an information provider, and forward the information to the web site.

The web site can comprise a merchant web site. For example, the web site can comprise a merchant web site where goods and/or services are sold. The web site can comprise any type of web site.

According to an aspect of the present invention, one or more information providers share information with an ID provider. Examples of information providers include Acxiom Corporation of Little Rock, Ark. and Information Card Foundation Inc. of Needham, Mass. An example of an ID provider includes PayPal of San Jose, Calif.

For example, when a consumer accesses a web site, PayPal can provide the merchant with specific information about the consumer at the front end and can fill in some information for the consumer to help the consumer sign in or log onto the site. The information about the consumer can be stored with the consumer and thus can subsequently be pushed to any suitable site.

As those skilled in the art will appreciate, information providers have access to various information about users, such as their email address, mailing address, shipping address, name, and user names. According to an embodiment, an ID provider can access this information and provide some portion or all of the required (to fill out a form) information about a particular user or consumer to a web site, such as merchant web site. The information can be provided at the front end of a user's access to the web site so as to facilitate further access thereto.

This can be done either with or without permission from the user. Thus, permission of the user can be requested prior to the information being provided by the ID provider to the web site. Either the ID provider or the web site can request such permission from the user.

Such information can include information that facilitates registration, log on, sign in, or purchasing by the user at the web site. The information can be used to fill out one or more forms of the web site. Thus, the information can be used to fill out a form to register the user with the web site, log in or sign on the user to the web site, and/or facilitate ordering merchandise or services from the web site.

The information about the user can be stored on a client computer of the user. The information about the user can be stored on a computer of the ID provider. Thus, the information can be available wherever the client computer goes. Any changes in the information can be pushed, such as by the ID provider, to any desired computer or web site. Thus, such changes can be provided to the user's client computer or to any web site that the user has previously accessed or subsequently accesses. Thus, the ID provider can automatically sign in, log on, or register a user at a web site and can at least partially fill out one or more forms associated with making a purchase from the web site.

According to an embodiment, the ID provider can also act as the information provider. The information provider can include multiple different information providers so as to provide a more complete information source for the ID provider.

Examples of embodiments are described with reference to FIGS. 1-3 below. These examples relate to the accessing of a merchant web site by a consumer. However, as those skilled in the art will appreciate, the disclosed methods and systems can apply to the accessing of various different types of website by various different entities, including both humans and machines.

Referring now to FIG. 1, a method for facilitating access to a merchant web site by a consumer is shown. The process can begin when a consumer initiates access the merchant web site, as indicated in block 101. The consumer can initiate access the web site by entering the web site's Internet Protocol (IP) address or Universal Resource Locater (URL) into the address box of a web browser, such as Microsoft Internet Explorer or Mozilla Firefox. Alternatively, the consumer can initiate access the web site by clicking on a link to the merchant web site that appears on another web site.

Initiating access to a merchant web site typically presents the consumer with a form to fill out in order to log in, sign on, or register with the merchant web site. An example of such a form is provided in FIG. 3 and is discussed below. The form may or may not be the first web page presented to the consumer. However, the form is often presented as one of the earlier web pages presented to the consumer and typically must be filled out in order to gain full assess to the merchant web site and/or to order goods from the merchant web site.

As a part of the log on, sign in, and/or registration process, the merchant web site can request identification (ID) information regarding the consumer from an ID provider, as indicated in block 102. Such ID information may be used to validate a digital ID or certificate of the user, for example.

In response to receiving a request for ID information from the merchant web site, the ID provider can provide the requested ID information to the merchant web site, as indicated in block 103. Receipt of the ID information from the ID provider by the merchant web site facilitates identification of the consumer to the merchant web site and thus allows the form to be accepted by the merchant web site.

According to an embodiment, the ID provider requests additional information regarding the consumer from an information provider, as indicated in block 103. The additional information can comprise any of the information that is used to log in, sign on, and/or register the consumer with the merchant web site. For example, the additional information can comprise the consumer's email address, mailing address, shipping address, name, and user name.

This request for additional information is typically performed prior to responding to the request for ID information from the merchant web site. In this manner, the additional information can be provided to the merchant web site along with the ID information.

The information provider can provide the additional information to the ID provider, as indicated in block 104. Communication between the ID provider and the information provider, as well as between the merchant web site and the ID provider, are typically performed via a network, such as the Internet.

The ID provider can provide the additional information to the merchant web site, as indicated in block 105. The merchant web site can use the additional information to facilitate access to the merchant web site by the consumer by using the additional information to fill out a form needed to gain access to at least a portion of the merchant web site. For example, the form can facilitate log on, sign in, or registration with the merchant web site.

In this manner, the consumer can be spared the task of filling out the form, or at least a portion thereof. The web merchant has provided a friendlier web site that is more likely to attract business and result in increase sales.

Figure 2:
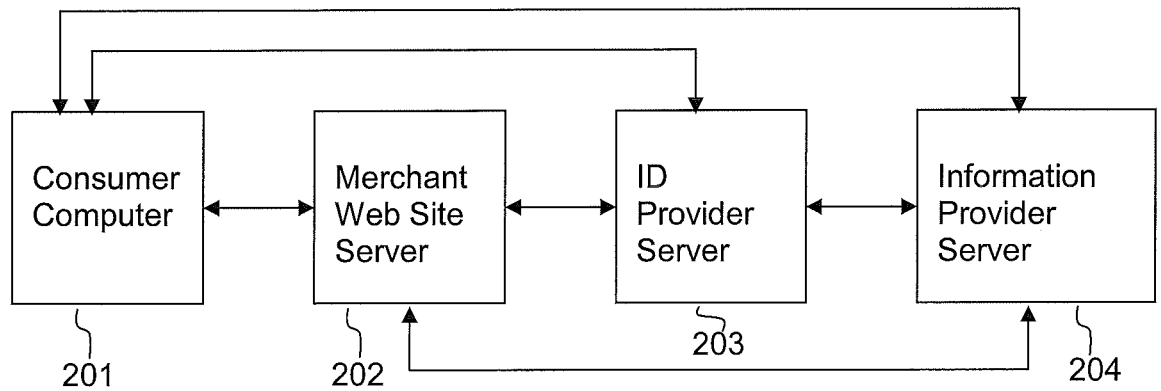
FIG. 2 is a block diagram showing a system for populating user information at a web site, according to an example of an embodiment.

Referring now to FIG. 2, a system for facilitating access to a merchant web site by a consumer is shown. The system can comprise an ID provider computer or server 203 in communication with an information provider computer or server 204. The ID provider server 203 and the information provider server 204 can be separate servers, located in separate places. and owed by separate companies. Alternatively, the ID provider server 203 and the information provider server 204 can be the same server, located in the same place, and/or owed by the same company. In any instance, the ID provider server 203 and the information provider server 204 can communicate with one another, such as via a local area network (LAN) or a wide area network (WAN) such as the Internet.

The ID provider 203 can be in communication with a merchant web site 202. The ID provider can communicate with the merchant web site via a local area network (LAN) or a wide area network (WAN) such as the Internet.

A consumer can communicate, via a consumer computer 201, with the merchant web site server 202. Optionally, the ID provider server 203 can be configured such that the consumer computer 201 can communicate therewith. Optionally, the information provider server 204 can similarly be configured such that the consumer computer 201 can communicate therewith. Thus, the consumer can give permission to either the merchant web site server 202, the ID provider server 203, or the information server 204 for the information provider server 204 to provide personal information regarding the consumer to the ID provider server 203.

If the consumer gives permission to the merchant web site server 202 for the information server 204 to provide personal information regarding the consumer to the ID provider server 203, then this permission is communicated from the merchant web site 202 to either the ID provider (from which the permission is communicated to the information provider server 204) or to the information provider server 204.

If the consumer gives permission to the ID provider server 203 for the information server 204 to provide personal information regarding the consumer to the ID provider server 203, then this permission can be communicated from the ID provider server 203 to the information provider server 204.

If the consumer gives permission to the information provider server 204 for the information server 204 to provide personal information regarding the consumer to the ID provider server 203, then the information provider provides the personal information to the ID provider server 203.

In any instance, the information provider server 204 can be configured such that it does not provide personal information regarding the consumer to the ID provider server 203 unless permission to do so (which is typically provided by the consumer) has been received. Alternatively, the information provider server 204 can be configured such that it does not require permission to provide personal information regarding the consumer to the ID provider server 203.

The information can be provided by the information provided server 204 to the ID provider server 203, from which the information is forwarded to the merchant web site server, or the information can be provided more directly to the merchant web site server 202 by skipping the ID provider server 203. The information provider 204 can alternatively provide the information to the consumer computer, from which it can be forwarded to the merchant web site server 202.

Referring now to FIG. 3, an example of a registration form is provided. Similar forms can be used for log on and sign in, although log on or sign in typically only require the entry of a user name and password. Those skilled in the art will appreciate that such forms can have a wide variety of different configurations, can require a wide variety of different information, and can have a wide variety of different appearance.

Indeed, the user information can be provided to a web site that does not use a form, per se. Rather, the web site may present the user with a series of queries instead of a form.

Having discussed the method and system of different user information population embodiments above, it may be instructive to discuss an example of the use thereof. In operation, the consumer is directed to a merchant web site. This may be the result of clicking on a link at another web site or the result of entering the merchant web site's Universal Resource Locater (URL) or Internet Protocol (IP) address into a web browser.

When prompted by the merchant web site to register, such as by filling out a registration form like that of FIG. 3, the user enters enough information to be identified therefrom. For example, the user can enter a name and an email address.

At this time, or at any other desired time, the merchant web site can request identification information from the ID provider. The identification provider can then obtain additional information from the information provider and then provide both the identification information and the additional information to the merchant web site.

The merchant web site can use the information to at least partially fill out the registration form, an order form, or in any other desired manner. Thus, the merchant web site can use the information in a manner that is convenient for the consumer and simplifies use of the merchant web site.

User, as the term is used herein, can be defined to include any person or machine that accesses a web site.

Consumer, as the term is used herein, can be defined to include any person or machine that accesses a merchant web site with an intent to make a purchase. The terms user and consumer can be used interchangeably herein.

An information provider, as the term is used herein, can be defined to include one or more computers or servers that are configured to provide information regarding a user. Such information can include email address, mailing address, shipping address, name, user name, and any other information. Information from an information provider can be provided via the Internet.

An ID provider, as the term is used herein, can be defined to include one or more computers or servers that are configured to facilitate the identification of users, such as for use by merchant web sites when the user is making a purchase.

Log on, as the term is used herein, can be defined to include providing information such as a user name and password to gain access to a web site.

Sign in, as the term is used herein, can be defined to include providing information such as a user name and password to gain access to a web site.

Registration, as the term is used herein, can be defined to include providing information such as name and email address to a web site and establishing a user name and password with the web site. Various other information can be provided by the user to the web site during a registration process. Embodiments can provide any and/or all information used to register a user.

The terms log on, sign in, and registration can be used interchangeably herein.

As used herein, the term form can include any query, questionnaire, or other way of providing a web site with information.

Although the methods and systems are described herein as being used for populating user related information, such as in forms at web sites, those skilled in the art will appreciate that such information can be provided to web sites for a variety of different uses.

Systems and methods disclosed herein can facilitate the population of user information at web pages such that the time consumption and annoyance otherwise associated therewith can be substantially mitigated. The errors commonly associated with manually typing such information into a form of a web site are substantially mitigated. Consequently, problems in filling order caused by such errors are similarly mitigated.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. An online service provider system, comprising:
   a non-transitory memory storing identification (ID) information associated with users; and
   one or more hardware processors coupled to the non-transitory memory and configured to read instructions from the non-transitory memory to cause the online service provider system to perform operations comprising:
      receiving, from a user device of a user, an indication of the user accessing a page of a website;
      in response to receiving the indication, retrieving a request for ID information;
      determining an identity of the user based on the indication;
      determining the page comprises one or more data fields corresponding to one or more types of information;
      retrieving, from one or more information provider servers, user information corresponding to at least one data field of the one or more data fields on the page of the website based on the determined identity of the user;
      providing the ID information associated with the user to the website; and
      automatically populating the one or more data fields on the page of the website with at least a part of the user information retrieved from the one or more information provider servers.

2. The online service provider system of claim 1, wherein an online service provider corresponding to the online service provider system, an entity corresponding to the website, and one or more information providers corresponding to the one or more information provider servers are different entities.

3. The online service provider system of claim 1, wherein automatically populating the one or more data fields comprises displaying the user information in the one or more data fields on the page of the website.

4. The online service provider system of claim 1, wherein the one or more data fields correspond to at least one of a personal information form or a financial information form for an account of the user with the website.

5. The online service provider system of claim 1, wherein the one or more data fields correspond to at least one of a shipping form or a billing form, and wherein the website comprises a merchant website for a merchant offering at least one item for sale to the user.

6. The online service provider system of claim 1, wherein the user information comprises at least one of log in information, sign in information, or account registration information.

7. The online service provider system of claim 1, wherein the operations further comprise receiving, from the user device, a notification to allow automatically filling the user information on the website, and wherein the one or more data fields are automatically populated based on the the notification.

8. The system of claim 1, wherein the operations further comprise transmitting the user information to the user device for storage.

9. The system of claim 8, wherein the operations further comprise:
   receiving, from the user device, a second indication that the user is accessing a second website comprising second data fields; and
   automatically populating the second data fields of the second website with the user formation stored on the user device.

10. A method comprising:
   receiving, by one or more hardware processors associated with an online service provider from a user device of a user, an indication of the user accessing a page of a website;
   determining, by the or more hardware processors, an identity of the user based on the indication;
   determining, by the one or more hardware processors, the page comprises one or more data fields corresponding to one or more types of information;
   receiving, by the one or more hardware processors, a request for identification (ID) information of the user;
   providing, by the one or more hardware processors, ID information associated with the user to the website;
   retrieving, by the one or more hardware processors from one or more information provider servers, user information corresponding to at least one data field of the one or more data fields on the page of the website based on the determined identity of the user; and automatically populating, by the one or more hardware processors, the one or more data fields on the page with the user information retrieved from the one or more information provider servers.

11. The method of claim 10, wherein the online service provider, an entity corresponding to the website, and one or more information providers corresponding to the one or more information provider servers are different entities.

12. The method of claim 10, further comprising storing the user information retrieved from the one or more information provider servers in a database local to the online service provider.

13. The method of claim 10, further comprising:
prompting, on the page of the website, the user for permission to provide the user information to the website, wherein the one or more data fields are automatically populated with the user information in response to receiving the permission from the user.

14. The method of claim 10, further comprising:
communicating the user information to the user device; and
in response to determining that the user is accessing a second website comprising second data fields via the user, automatically populating the second data fields with the user information stored locally on the user device.

15. A non-transitory machine-readable medium having stored thereon machine-readable instructions executable to cause a machine to perform operations comprising:
receiving, from a user device of a user, an indication of the user accessing a page of a website;
determining the page comprises one or more data fields corresponding to one or more types of information;
retrieving, from one or more information provider servers, user information corresponding to at least one data field of the one or more data fields on the page of the website based on the determined identity of the user;
receiving a request for identification (ID) information of the user through the website;
in response to receiving the request, providing ID information associated with the user to the website; and
automatically populating the one or more data fields on the page displayed on the user device based on the user information retrieved from the one or more information provider servers.

16. The non-transitory machine-readable medium of claim 15, wherein automatically populating the one or more data fields comprises displaying the user information in the one or more data fields on the website.

17. The non-transitory machine-readable medium of claim 15, wherein the one or more data fields are used to sign in or register the with the website.

18. The non-transitory machine-readable medium of claim 15, in an online service provider associated with the machine, an entity corresponding to the website, and one or more information providers corresponding to the one or more information provider servers are different entities.

19. The non-transitory machine-readable medium of claim 18, wherein the user information comprises at least one of an email address, a mailing address, shipping address, a user name, or a name of the user.

20. The non-transitory machine-readable medium of claim 15, wherein the one or more information provider servers comprise an information card service provider server, and wherein the user information comprises information from an information card of the user.

* * * * *

UNITED STATES PATENT AND TRADEMARK OFFICE
CERTIFICATE OF CORRECTION

PATENT NO. : 10,579,720 B2
APPLICATION NO. : 15/043461
DATED : March 3, 2020
INVENTOR(S) : Andrew Keith Nash and Michael Barrett It is certified that error appears in the above-identified patent and that said Letters Patent is hereby corrected as shown below:

In the Claims

Column 8, Line 19, please correct as follows:
prises displaying at least the part of the user information in the one or more Column 9, Line 26, please correct as follows:
user device, automatically populating the second data fields Column 10, Line 19, please correct as follows:
in or register the user with the website.

Column 10, Line 21, please correct as follows:
claim 15, wherein an online service provider associated with the Column 10, Line 27, please correct as follows:
one of an email address, a mailing address, a shipping address, Signed and Sealed this
Twenty-fourth Day of November, 2020

Andrei Iancu
*Director of the United States Patent and Trademark Office*